United States Patent Office 2,699,105
Patented Jan. 11, 1955

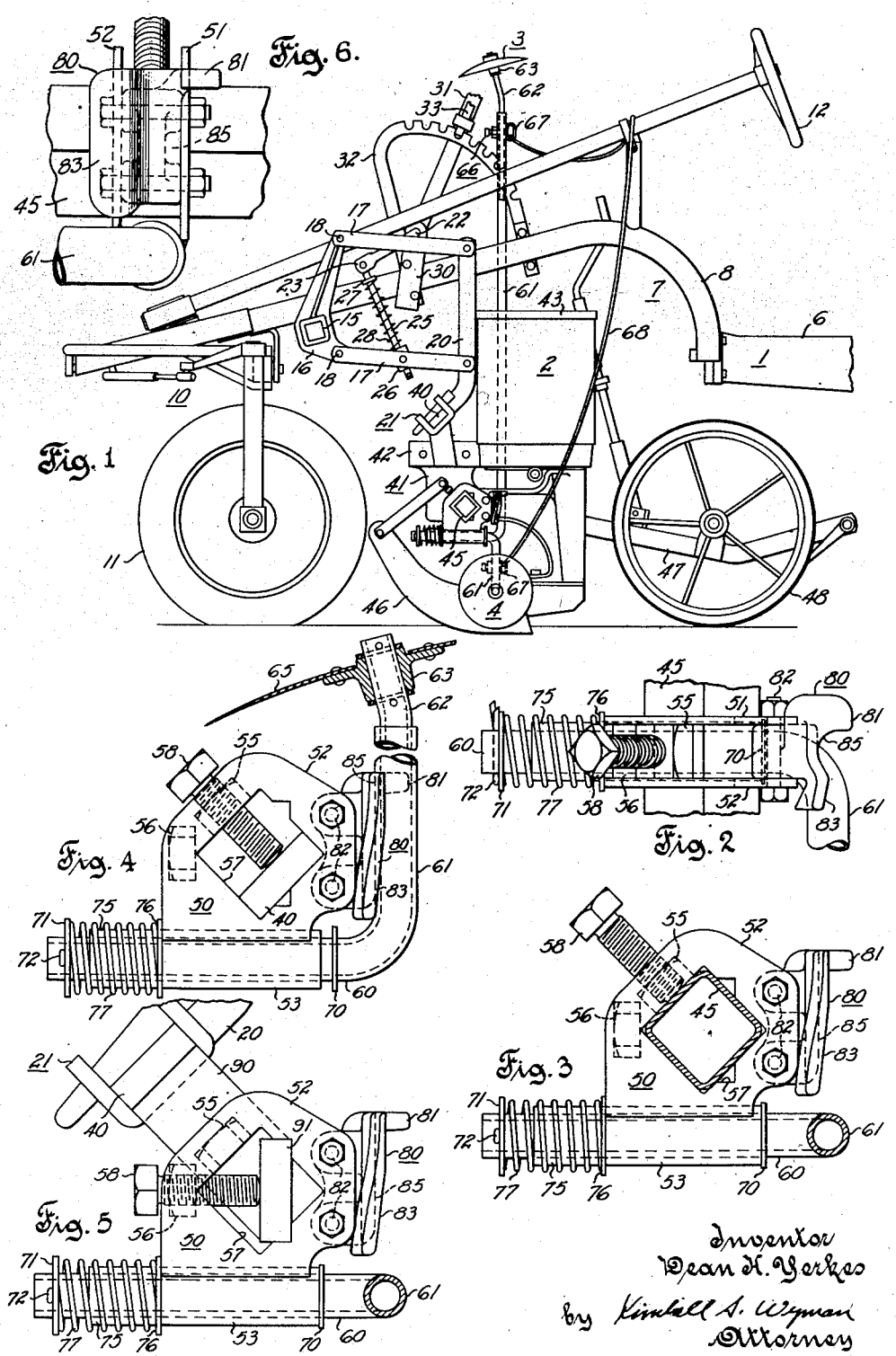

2,699,105

MARKER MOUNTING

Dean H. Yerkes, La Crosse, Wis., assignor to Allis-Chalmers Manufacturing Company, Milwaukee, Wis., a corporation of Delaware Application March 28, 1949, Serial No. 83,940

1 Claim. (Cl. 97—230)

This invention relates generally to agricultural implements and is more particularly concerned with and directed toward a construction and/or combination of parts affording particular advantage in the mounting and/or operation of a row marking device for agricultural implements.

It is an object of the present invention to provide an improved row marking device which may be quickly attached, as a unit, to a variety of supporting frame members having oppositely facing parallel sides whether these parallel sides be positioned normal to the ground or at an angle thereto.

Another object of this invention is to provide an improved row marking device including parts constructed and arranged in a novel manner and affording means for releasably maintaining a marking element on such device in a raised position relative to the ground.

And accordingly the present invention may be considered as comprising the various constructions and combinations hereinafter more particularly pointed out in the detailed description and appended claim, reference being had to the accompanying drawings, in which:

Fig. 1 is a side view of a tractor front mounted planter illustrating the use of the subject marking device therewith;

Fig. 2 is a partial plan view of the attaching bracket portion of the marking device shown in Fig. 1;

Fig. 3 is a side view of the structure shown in Fig. 2;

Fig. 4 is a side view of the marking device attached to a differently positioned supporting bar than that shown in Fig. 1, with the marker raised to its upright or transport position;

Fig. 5 is a side view of the marking device attached to still another supporting bar; and Fig. 6 is an end view of the structure shown in Fig. 3 taken from the right side of the latter.

Referring particularly to Fig. 1 it will be seen that the structure chosen to illustrate one embodiment of the present invention comprises generally a tractor 1 having a planter 2 mounted on a forward portion thereof and a pair of row markers 3 and 4 connected to a portion of the planter structure and disposed on either side thereof, the marker 3 being shown in transport position.

Although not shown in its entirety, tractor 1 may be considered as having a rear engine and traction means with an operator's seat positioned forward of the engine. Extending forward from the rear traction means is a tubular stub frame member 6 having a detachable connection at its front end with a forward frame portion 7 comprising a pair of laterally spaced parallel arched members 8 (only one of which is shown) extending forward to a suitable connection with a supporting front axle structure 10 including a pair of dirigible wheels 11 (for the sake of clarity the near front wheel has been removed in Fig. 1). The usual control means, including steering wheel 12, are positioned within easy reach of an operator seated on the tractor. Since the tractor forms no part of the claimed structure, it is believed that the foregoing description is sufficient for a complete understanding of the present invention.

For mounting implements in underslung relation to the forward portion of the tractor there is provided an implement supporting means comprising a transverse rigid cross bar 15 detachably clamped by suitable means (not shown) to opposed underside portions of tubular frame members 8 with cross bar 15 preferably extending equal distances laterally beyond the sides of frame members 8 and a pair of similar laterally aligned hangers 16 suitably clamped or otherwise adjustably fixedly secured to opposite end portions of cross bar 15 in preferably symmetrical relation with respect to the longitudinal axis of the tractor, as is the usual practice. And in this connection, it is to be understood that the tool supporting means at opposite sides of the tractor are identical, and that the following description of one such means will suffice for a complete understanding of the present invention. A pair of rearwardly extending parallel links 17 are carried by hanger 16 for vertical swinging movement about vertically spaced pivot axes, provided by pins 18 or the like, generally parallel to the longitudinal axis of cross bar 15, and a vertically disposed rear link 20 pivotally connected to the rear end portions of the pair of parallel links 17. Rear link 20 includes at its lower end a forwardly and downwardly extending portion presenting a tool bar receiving element 21. Parallel links 17 are additionally supported for simultaneous vertical adjustment through means of a transverse rock shaft 22 having forwardly extending lift arm 23 pivotally connected with the upper end of a lift rod 25 which in turn is slidably pivotally connected with an intermediate portion of the adjacent lower link 17 by means of a conventional connector 26. Rod 25 is provided with a spring seat 27 and is surrounded by a compression spring 28 having its lower end abutting the top side of connector 26 and having its upper end engaging spring seat 27.

Rock shaft 22 is rotatably supported in suitable brackets 30 detachably secured to and projecting above opposite top side portions of tubular frame members 8. Actuation of rock shaft 22 is effected by means of a lever 31 fixed thereto and extending upward alongside a notched quadrant 32 fixedly carried by the adjacent frame member 8. Lever 31 is provided with a conventional quadrant engaging latch rod 33 and it should be understood that the upper portion of lever 31 preferably extends rearward to a point within easy reach of an operator seated on the tractor. And as previously indicated, it should be understood that a parallel linkage, lift arm 23, lift rod 25 and tool bar receiving element 21 are disposed on the far side of the tractor in transverse alignment with the corresponding near-side elements.

Laterally aligned tool bar receiving elements 21 detachably mount implement 2 through means comprising a rigid transverse tool bar 40, rectangular in cross section, an implement supporting frame structure 41 having a forward portion 42 supporting a seed dispensing container 43 and including a fixedly positioned transversely disposed tubular frame member 45 supporting furrow opener 46, and a rear frame portion 47 supported by press wheels 48.

At opposite end portions of tubular member 45 there is adjustably secured a pair of row marking devices 3 and 4, the near or left hand marker 4 being shown in ground engaging position and the far or right hand marker 3 being shown in its transport position (Fig. 1). In almost all respects these two markers are identical and, therefore, the description will be confined to marker 4 on the near side of the tractor with special mention being made of the differences in structure involved in making the right hand marker 3.

Referring also to Figs. 2 and 3 it will be noted that the attaching bracket portion 50 of row marker 4 which is adapted to receive tubular member 45 of implement supporting frame 41 comprises a pair of similar laterally spaced parallel plate members 51 and 52 rigidly united, as by welding, at their lower edges to an elongated tubular bearing part or member 53. Plate members 51 and 52 are also fixed in spaced relation to one another by means of a pair of internally threaded nut-like parts 55 and 56 secured between the two plates at intermediate portions therealong. A pair of transversely aligned openings 57 are formed in plates 51 and 52 for positioning same along supporting frame member 45 and in this connection it will be noted (Fig. 3) that bracket 50 is securely held in any selected position along member 45 by suitable means such as cap screw 58 positioned through nut-like part 55 in adjustable pressing relation to the adjacent side of tubular member 45.

Rotatably mounted in bearing part 53 is a journal member or bent end portion 60 of a marker arm in the form of a tubular member 61 which extends laterally away from bracket 50. The outer end of member 61 supportingly carries a second tubular member 62 and the two members are disposed in telescopic relation with respect to each other, with member 62 rotatably mounting, as by a bearing 63, a disk shaped marking element 65. Disk mounting tubular member 62 is adjustably fixed with respect to tubular member 61 by any suitable means such as part 66 which has a portion thereof positioned through a pair of transversely aligned openings (not shown) in member 61 and through any selected pair of similar openings in member 62. Part 66 also includes a projecting loop portion 67 for securing one end of a rope 68 or the like thereto for manually raising and lowering the marker from a remote position on the tractor.

The bent end portion 60 of member 61 extends through bearing 53 and is fixed for limited movement axially with respect to bearing part 53 by means of a collar 70 fixed to member portion 60, as by welding, and an axially spaced washer 71 held against movement toward the end of member 60 by suitable means such as pin 72. Detachably supported on bent portion 60 between washer 71 and bearing part 53 is an elongated collar 75 having a flange at one end affording a spring seat 76 and a surrounding compression spring 77 pressingly engages washer 71 at one end and spring seat 76 at the other end. Thus it is apparent that while bent portion 60 of member 61 is free to rotate within tubular bearing part 53 it is also capable of being moved a limited distance along the longitudinal axis of the bearing, that is until washer 71 approaches the adjacent end of collar 75.

For securing the row marker in an elevated or inoperative position there is provided a catch means 80 comprising a stop projection 81 and this catch means is preferably detachably secured between the adjacent rear or right hand portions (as viewed in Figs. 1 to 5) of plate members 51 and 52 by suitable means such as bolts 82. The portion of catch means 80 adjacent tubular member 61 of row marker 4 comprises a gradually forwardly sloping vertical flange or guide surface 83 which is convex for slidably engaging marker member 61, and this flange terminates at its inner edge in a concave recess or grooved part 85 for receiving member 61 in fixed bearing relation thereto. More particularly, to place row marker 4 in a releasably fixed inoperative position the operator may swing marker element 65 and supporting members 61 and 62, as a unit, upward about bearing 53 by pulling generally upward on rope 68 until member 61 engages vertical flange portion 83 of catch means 80. Continued upward movement of member 61 causes bent portion 60 to move rearwardly in opposition to the force exerted by spring 77 and as marker member 61 approaches a vertical position it will slide inwardly over flange 83 into groove 85. It will be obvious that the force of spring 77 tending to move bent portion 60 forward (to the left in the accompanying drawings) will secure member 61 in groove 85 until member 61 is pushed downwardly, at which time bent portion 60 will move rearwardly (to the right as viewed in the drawings) in opposition to spring 77 and member 61 will swing laterally outward away from catch means 80. Also, it is to be understood that for marker 3 on the right hand or far side of the tractor the catch means will be formed oppositely to that just described in order to accommodate a tubular member approaching it from the opposite side.

Referring particularly to Figs. 3, 4 and 5 it will be seen that the transversely aligned openings 57 are irregularly shaped in order to accommodate a variety of supporting bars having different shapes and relative positions. Fig. 3 illustrates the attaching bracket 50 receiving a tubular member 45, square in cross section, while Fig. 4 shows its use with a support such as tool bar 40 in Fig. 1 wherein the supporting bar is rectangular in cross section, having one pair of edges of considerably greater width than the other pair of edges, and disposed at an angle with respect to the ground. Still another type of connection is illustrated in Fig. 5 wherein a tool bar 40 has a depending part 90 fixed thereto presenting a relatively thin laterally extending support member 91 with its greater width disposed generally normal to the ground. It will be noted that in all three arrangements just described cap screw 58 is disposed within one of the threaded parts 55 or 56 to position it at right angles with respect to a flat surface on the supporting bar.

It will be apparent from the above description that a row marker constructed in accordance with this invention provides a readily attachable unit for a number of different supporting elements having various shapes in cross section and positioned at different angles with respect to the ground. Moreover, it will be noted that a simple and inexpensive means for releasably maintaining the marker in an inoperative position has been provided which may be fully utilized by an operator seated on the tractor.

And although this invention has been described as having particular utility when applied to a row marker for an underslung planter attachment it is not intended to limit the invention to the exact constructions and combinations herein shown and described for purposes of illustration as various modifications within the scope of the appended claim may occur to persons skilled in the art.

It is claimed and desired to secure by Letters Patent:

A marker assembly for agricultural implements comprising, in combination, a bracket structure including a horizontal elongated tubular bearing, a journal member mounted within said bearing for rotation and axial movement relative thereto, a marker supporting arm rigid with and extending transversely of said journal member at one side of said bracket structure, said arm being vertically swingable about the axis of said bearing between lowered operative position and raised inoperative position, spring means interposed between said bracket structure and said journal member so as to impart axial thrust to said journal member tending to move said arm toward said one side of said bracket structure, and catch means secured to said one side of said bracket structure above said bearing, said catch means engaging and releasably holding said arm in raised inoperative position, said catch means including a part having a vertically disposed groove extending radially of said bearing and a convex guide surface at one side of said groove merging with said groove, said guide surface being of sufficient vertical extent to engage said arm shortly after it has been raised above the horizontal in its upward vertical swing, engagement of said convex guide surface with said arm during upward vertical swing thereof serving to move said journal member axially against said axial thrust of said spring means, said groove receiving a portion of said arm in its raised inoperative position and said spring means releasably holding said arm in its raised inoperative position.

References Cited in the file of this patent

UNITED STATES PATENTS

| | | |
|---|---|---|
| 564,425 | Ham | July 21, 1896 |
| 869,973 | Lehmkuhl | Nov. 5, 1907 |
| 1,152,345 | Spears | Aug. 31, 1915 |
| 1,360,531 | Hyatt | Nov. 30, 1920 |
| 1,644,231 | Bosworth | Oct. 4, 1927 |
| 1,888,502 | Holstein | Nov. 22, 1932 |
| 1,901,539 | Tapp | Mar. 14, 1933 |
| 2,175,282 | Cormany | Oct. 10, 1939 |
| 2,176,363 | Silver | Oct. 17, 1939 |
| 2,484,759 | Starr | Oct. 11, 1949 |
| 2,584,200 | Hand et al. | Feb. 5, 1952 |